United States Patent
Kanamaru et al.

[11] Patent Number: 5,891,414
[45] Date of Patent: Apr. 6, 1999

[54] METHOD FOR PRODUCING CARBON BLACK

[75] Inventors: Shininchi Kanamaru; Syushichi Yoshimura, both of Kitakyushu, Japan

[73] Assignee: Mitsubishi Chemical Corporation, Tokyo, Japan

[21] Appl. No.: 686,812

[22] Filed: Jul. 26, 1996

[30] Foreign Application Priority Data

Jul. 27, 1995 [JP] Japan .................................. 7-191507

[51] Int. Cl.⁶ .................................................. C09C 1/50
[52] U.S. Cl. ........................... 423/455; 423/450; 423/456
[58] Field of Search .................................... 423/455, 456, 423/457, 450, 449.1

[56] References Cited

U.S. PATENT DOCUMENTS

| | | |
|---|---|---|
| 3,998,934 | 12/1976 | Vanderveen .............................. 423/455 |
| 4,206,192 | 6/1980 | Austin ...................................... 423/450 |
| 4,554,149 | 11/1985 | Cheng ...................................... 423/450 |
| 4,751,069 | 6/1988 | Ducote et al. .......................... 423/458 |
| 5,262,146 | 11/1993 | Kanamaru et al. ..................... 423/455 |

*Primary Examiner*—Michael Lewis
*Assistant Examiner*—Stuart L. Hendrickson
*Attorney, Agent, or Firm*—Oblon, Spivak, McClelland, Maier & Neustadt, P.C.

[57] ABSTRACT

The present invention relates to a carbon black producing method. More particularly, the present invention relates to a carbon black producing method using an oil furnace, wherein the cooling medium for stopping the carbon black producing reaction is gas.

14 Claims, 3 Drawing Sheets

METHOD FOR PRODUCING CARBON BLACK

BACKGROUND OF THE INVENTION

1. Field of the Invention

The present invention relates to a method for producing carbon black. More particularly, the present invention relates to a method for producing carbon black, by an oil furnace method, wherein small size particle carbon black is obtained with a high yield.

2. Discussion of the Background

An oil furnace method for producing carbon black is usually conducted in a furnace comprising a first reaction zone, where fuel is burned by air or an oxygen-containing gas which generates a high temperature atmosphere necessary for the heat decomposition of a feedstock hydrocarbon, a second reaction zone situated adjacent to said first reaction zone, where a feedstock hydrocarbon is introduced to said high temperature atmosphere to induce a carbon black producing reaction, and a third reaction zone situated downstream of said second reaction zone, where a cooling medium is introduced to stop the carbon black producing reaction.

As the cooling medium used in the above described process, a water spray is usually used because of ease of handling and high cooling effect, and no other cooling medium has been actively used.

For example, in Unexamined Japanese Patent Application Laid-Open (KOKAI) No. Heisei 7-102185 (1995), nitrogen-enriched air is introduced between a feedstock hydrocarbon spraying point and a cooling point but the object of introducing nitrogen-enriched air is to control the quality of carbon black, and the final cooling is conducted, by water, as conventionally done. No method for cooling other than that using the water is described or suggested in this publication.

The object of the present invention is to optimize the cooling medium used in the third reaction zone, and the way of introducing this cooling medium to obtain small size particle carbon black.

The present inventors have conducted studies on the cooling medium and the way of introducing it into the furnace to solve the above problems, and found that unexpectedly, cooling by a gaseous medium is advantageous for obtaining higher yields than conventionally obtained when water is used. Namely, the present inventors conducted studies using various kinds of reaction stopping media, and found that although cooling by water has advantages such that it can be easily conducted, it has also disadvantages such that the gasification of carbon black which lowers a carbon black yield, is increased. The present inventors presumed that this is because, in the neighborhood of the water introducing point, the water vapor concentration becomes high, and the temperature condition in the cooling process increases reactions that gasify carbon black such as a water gas reaction. Also the present inventors inferred that stopping the carbon black producing reaction with water causes a delay in vaporization of water droplets and problems on mixing efficiency with a high-temperature gas from the second reaction zone, which consequently causes unevenness of reaction stopping.

The present inventors also found that, by introducing the cooling medium vertically to the axial direction of the furnace, a reaction stopping effect can be improved, consequently small size particle carbon black is obtained in high yield, and they attained to the present invention.

SUMMARY OF THE INVENTION

Namely, the present invention relates to a carbon black producing method conducted in an oil furnace comprising a first reaction zone where fuel and air or an oxygen containing gas are burned to generate a high temperature gas, a second reaction zone situated adjacent to said first reaction zone, where a feedstock hydrocarbon is introduced to said high temperature gas to induce a carbon black producing reaction and a third reaction zone where the atmosphere is quenched to stop said carbon black producing reaction, wherein a gaseous reaction stopping medium is used in the third reaction zone.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
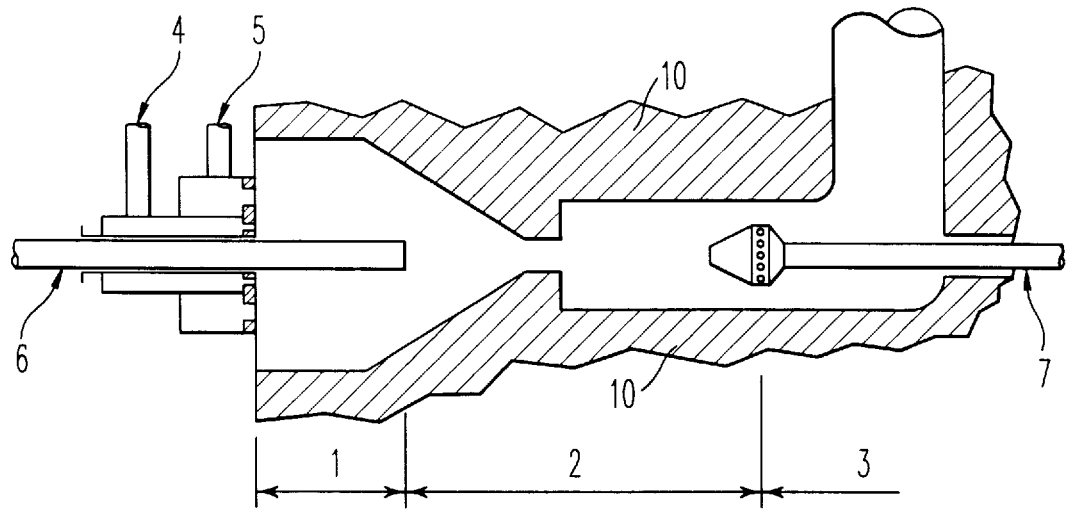
FIG. 1 depicts an apparatus for producing carbon black.

Now, the present invention will be described in further detail.

The present invention is conducted by an oil furnace method, which may be conducted in an oil furnace, comprising a first reaction zone where fuel and air or an oxygen containing gas are burned to generate a high temperature gas, a second reaction zone situated adjacent to said first reaction zone where a feedstock hydrocarbon is introduced to said high temperature gas to induce a carbon black producing reaction, and a third reaction zone where an atmosphere is quenched to stop a carbon black producing reaction. Here, the oil furnace such as conventionally used one can be employed.

In the first reaction zone inside the furnace, a high temperature atmosphere is produced by burning a fuel (gas or liquid). In this way, high temperature energy, to produce carbon black in the second reaction zone, is generated in the form of a high temperature gas stream. To obtain a carbon black having small particle size, it is preferable to conduct this burning reaction under air, fuel/ratio as near to theoretical flame temperature as possible. Preferably, the ratio of the amount of carbon in combusted feedstock hydrocarbon/amount of carbon in the total feedstock hydrocarbon introduced is kept from 0.05 to 0.3, more preferably from 0.1 to 0.2.

The high temperature gas stream in the first reaction zone is generated by mixing a fuel hydrocarbon (gas or liquid) and an oxygen containing gas such as air, oxygen or their mixture and conducting the burning of the fuel hydrocarbon. As fuel, hydrogen, carbon monoxide, methane, natural gas, coal gas, as well as petroleum type liquid fuel such as kerosene, gasoline, naphtha, heavy oil, etc., coal type liquid fuel such as creosote oil, naphthalene oil, carbonic acid oil are suitably used.

In the second reaction zone, an introduced feedstock hydrocarbon and the high temperature gas stream from the first reaction zone react to produce carbon black. Here a turbulent flow is necessary to quickly gasify the introduced feedstock hydrocarbon, and to obtain this turbulent flow, means such as establishing choke or local high speed zone are taken. When a choke is used, preferably the gas flow rate at the choking point is from 300 m/sec to 500 m/sec, and the ratio of the diameter at the choking point to the diameter before the choking point is preferably 1/4 to 1/9, more preferably 1/5 to 1/6.5.

As feedstock hydrocarbon, aromatic hydrocarbon such as benzene, toluene, xylene, naphthalene, anthrathene, coal type liquid fuel such as creosote oil, naphthalene oil, carbonic acid oil, petroleum type oil such as ethylene heavy end oil, FCC oil, etc., acetylene type hydrocarbon, ethylene type hydrocarbon such as ethylene, propylene, aliphatic hydrocarbon such as pentane, hexane, etc., are suitably used.

In the third reaction zone the atmosphere is quenched so that the carbon black producing reaction is stopped. Here, in the present invention, a gas is used as the reaction stopping medium. So long as the medium is in the gas state when introduced into the furnace, it can be employed. An inert gas such as nitrogen is preferably used. Also, it is preferable to use a gas that does not contain water or a gas that contains water of no more than 20 wt. %, preferably, ≦15 wt. %, more preferably ≦10 wt. %, even more preferably ≦5 wt. %. Water which is present in the reaction stopping medium may be in the gas or liquid phase. For example, a furnace gas after removing carbon black from which more than 20 wt. % of water vapor is removed, or that doesn't contain more than 20 wt. % of water vapor, carbon dioxide, or other industrially produced or by produced gas that doesn't contain water or contains water of no more than 20% of water, are suitably used. Using these media as reaction stopping medium, a water vapor concentration in the third reaction zone can be held down and consequently gasification of carbon black can be held down.

To obtain carbon black, with a small size particle and small distribution, it is necessary to quench very quickly, and for this purpose, the introduced reaction stopping gas has to be quickly mixed to the high temperature gas stream from the second reaction zone. To attain this object, the reaction stopping gas is introduced almost vertically to the axial direction of the furnace, and at the same time introduced at a plurality of points, at least 2 points, preferably no less than 4 points. For this purpose, the reaction stopping gas can be introduced by means of plural nozzles situated in different places of the furnace, or by means of plural ejecting holes in the nozzle. Furthermore, to accelerate mixing and heighten the cooling effect, the rate of reaction stopping gas introduced in the third reaction zone is preferably faster than the rate of high temperature gas stream from the second reaction zone, more preferably a high temperature gas stream from the second reaction zone is from 20 m/sec to 30 m/sec, more preferably 23–28 m/sec and the ejecting speed of a reaction stopping gas introduced in the third reaction zone is preferably at least 40 m/sec, more preferably at least 50 m/sec. The ratio of the rate of high temperature gas stream from the second reaction zone to rate of reaction stopping gas introduced in the third reaction zone is preferably 1:1.30 to 2.5, more preferably 1:1.33 to 2. By controlling the third reaction zone under these conditions, unnecessary gasification of carbon black is held down, and quick quenching can be achieved.

The cooled gas stream containing carbon black is introduced to a cyclon or a bag filter through a fume pass, and the gas and carbon black are separated and retrieved, as conventionally done. The retrieved carbon black can be aftertreated according to individual purposes.

Now, the present invention will be described in further details with reference to Examples. However, it should be understood that the present invention is by no means restricted to such specific Examples.

EXAMPLES

Using a producing apparatus as described in FIG. 1, using feedstock hydrocarbon and fuel having properties and component shown in Table 1 and Table 2, various kind of carbon black were produced, under the conditions shown in Table 3. The properties of the obtained carbon black, namely, the iodine absorption number, SEM and the standard deviation, and the yield to the feedstock hydrocarbon, are also described in Table 3.

Figure 2:
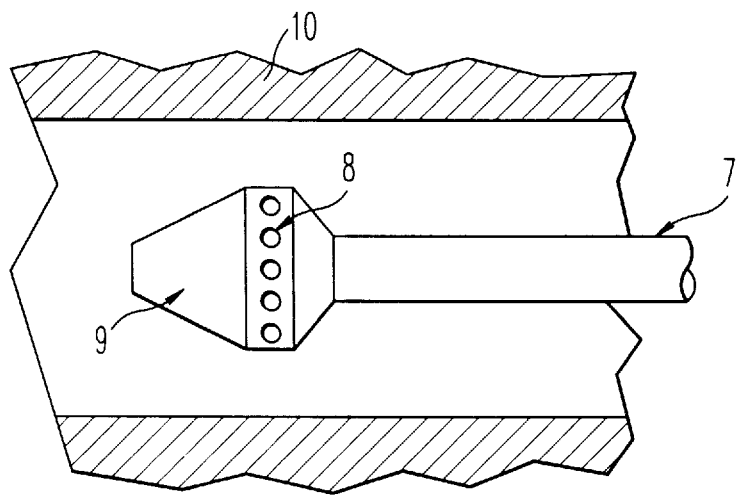
FIG. 2 describes a reaction stopping medium introducing apparatus.

FIG. 2 describes the part of the apparatus described in FIG. 1, describing mainly the reaction stopping medium introducing apparatus.

Figure 3:
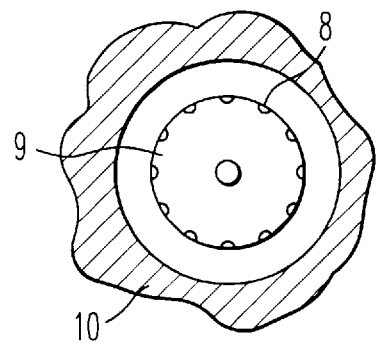
FIG. 3 describes the reaction stopping medium introducing apparatus of FIG. 2, observed from the side of the reaction zone.

FIG. 3 describes the reaction stopping medium introducing apparatus of the present invention described in FIG. 2, observed from the side of the reaction zone.

Figure 4:
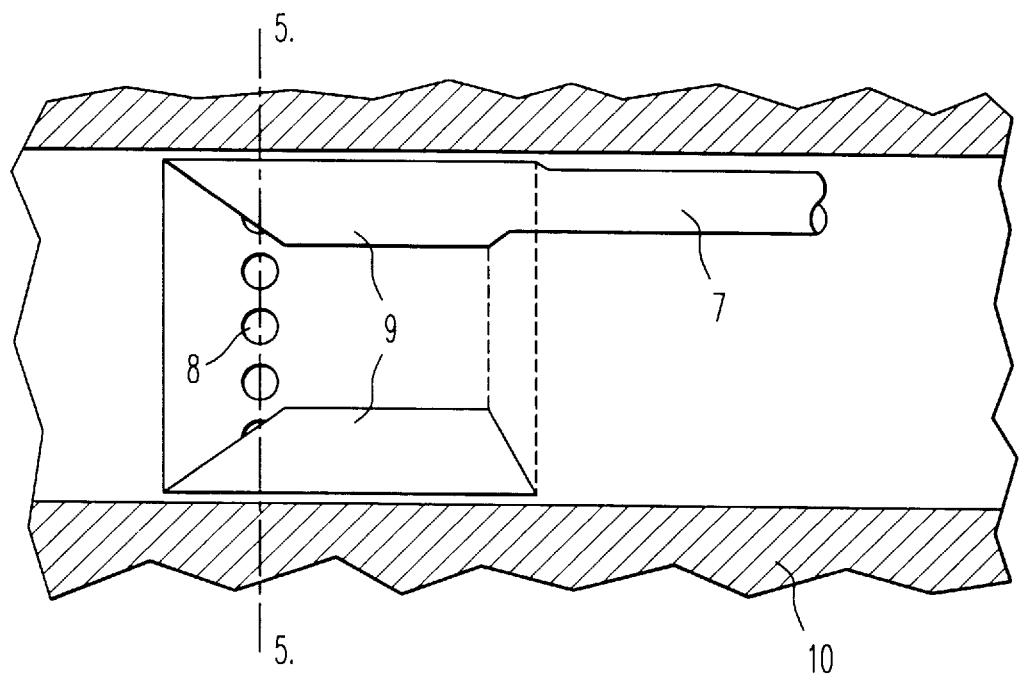
FIG. 4 shows a lateral cross sectional view of another example of a reaction stopping medium introducing apparatus.

FIG. 4 shows a lateral cross sectional view of another example of an apparatus for introducing reaction stopping medium of the present invention.

Figure 5:
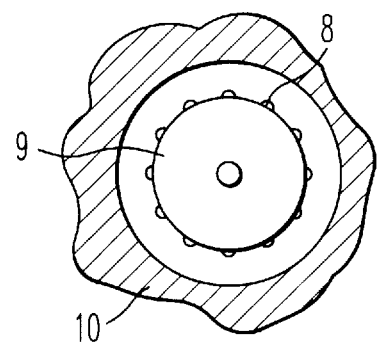
FIG. 5 shows an A—A cross sectional view of the apparatus of FIG. 4.

FIG. 5 shows an A—A cross sectional view of the apparatus of the present invention described in, the FIG. 4.

Figure 6:
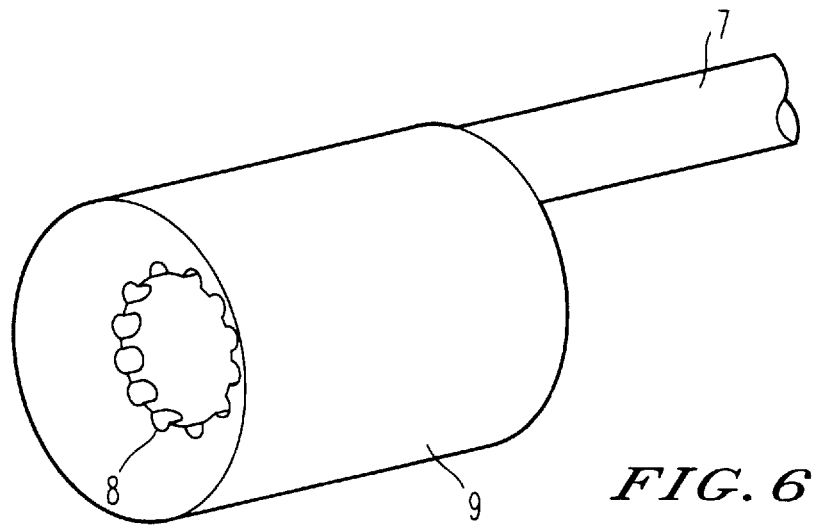
FIG. 6 shows the apparatus described in the FIG. 4, observed from the side of the first reaction zone
Figure 7:
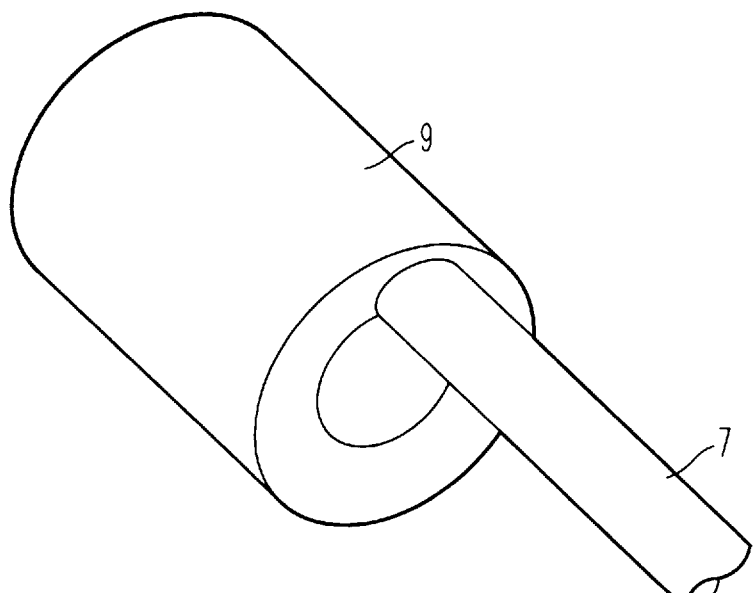
FIG. 7 shows the apparatus described in FIG. 5, observed from the opposite side of the first reaction zone.

FIG. 6 and FIG. 7 show the apparatus described in the FIG. 4 and FIG. 5, observed from the side of the first reaction zone and from the opposite side of the first reaction zone, respectively.

In these Figures, 1 is the first reaction zone, 2 is the second reaction zone, 3 is the third reaction zone, 4 is a fuel introducing nozzle, 5 is an oxygen containing gas introducing nozzle, 6 is a feedstock hydrocarbon introducing nozzle, 7 is a reaction stopping medium introducing nozzle, 8 is a reaction stopping medium ejecting hole, 9 is a high temperature gas introducing guide, 10 is a furnace wall.

TABLE 1

| Properties of feedstock hydrocarbon | |
|---|---|
| kind | creosote oil |
| specitic gravity (15° C.) | 1.1 |
| carbon content (wt %) | 90.8 |
| hydrogen content (wt %) | 6.1 |
| viscosity (50° C.) | 10 cp |

TABLE 2

| kind | Fuel | coal gas |
|---|---|---|
| composition (vol %) | $CO_2$ | 2 |
| | $O_2$ | 0.5 |
| | $C_nH_m$ | 3.2 |
| | $CO$ | 6.5 |
| | $H_2$ | 54 |
| | $CH_4$ | 28.6 |
| | $N_2$ | 5.2 |

TABLE 3

Producing conditions and Properties of the obtained Carbon Black

| | Comparative Ex. 1 | Example 1 | Example 2 |
|---|---|---|---|
| amount of air (m³/H) | 800 | 800 | 800 |
| amount of fuel (m³/H) | 145 | 145 | 145 |
| amount of feedstock hydrocarbon (kg/H) | 70 | 58 | 55 |
| reaction stopping condition | | | |
| kind of reaction stopping medium | water | nitrogen | nitrogen |
| medium introducing point | 340 mm | 340 nm | 340 mm |
| amount of introduced medium | 150 kg/H | 200 m³/H | 500 m³/H |
| iodine absorption number (mg/g) | 232 | 233 | 240 |
| SEM (m²/g) | 170 | 180 | 185 |
| σ (µ) | 4.6 | 4.2 | 4 |
| yield to the feedstock hydrocarbon (%) | 23 | 28 | 25 |

Examples 1 and 2

Carbon black is obtained, under the conditions described in Table 3. Fuel and air are introduced from nozzle 4 and 5, respectively, and a high temperature gas stream is generated in the first reaction zone 1. Feedstock hydrocarbon is introduced from nozzle 6 to induce a carbon black producing reaction in the second reaction zone 2. Then, nitrogen is introduced from nozzle 7 and sprayed from holes 8. The distance between the end of hydrocarbon introducing nozzle 6 and holes 8 are 340 mm.

The properties of the obtained carbon black are described in Table 3.

Comparative Example 1

Carbon black is obtained under the conditions described in Table 3. The reaction is conducted with no major difference from Examples 1 or 2, except that water is used as the reaction stopping medium, and carbon black with similar iodine absorption is obtained. It is noted that the yield is lower than the Examples 1 or 2, when a similar iodine absorption number was obtained. In Example 1, a high SEM, namely small particle size carbon black is obtained in higher yield than Comparative example. Also, in Example 2, carbon black is produced using greater amount of reaction stopping gas than Example 1, and carbon black with still more higher SEM is obtained, yet in high yield.

Considering the above results, using gas as reaction stopping medium and controlling the mixing condition of this medium with high temperature gas from the second reaction zone adequately, small size carbon black is obtained in high yield.

(1) iodine absorption

Measured in accordance with JIS K6221-1982.

(2) σ, SEM

A sample of carbon black is thrown into chloroform and 200 KHz of supersonic wave is irradiated and dispersed, and then the dispersed sample is fixed to the support membrane. This is observed by an electron microscope and the mean surface diameter ($\Sigma nd^3/\Sigma nd^2$) and the standard deviation (σ) are calculated in mµ (millimicron) order. Then SEM (m²/g) is obtained by the following equation:

$$SEM(m^2/g) = 6000 / (1.86 \times Da)$$

Here, Da is the mean surface diameter.

According to the present invention, carbon black with small particle size can be obtained in high yield.

Having generally described this invention, a further understanding can be obtained by reference to certain specific examples which are provided herein for purposes of illustration only and are not intended to be limiting unless otherwise specified.

The present specification is based on Japanese Application 191507/1995, filed in the Japanese Patent Office on Jul. 27, 1995, the entire contents of which are hereby incorporated by reference. The entire contents of Japanese Patent Applications 178441/1995 filed on Jul. 14, 1995 and 006089/1996 filed on Jan. 17, 1996 are hereby incorporated by reference. The entire contents of the U.S. application Ser. No. 08/680,027 filed on Jul. 15, 1996, entitled is hereby incorporated by reference.

What is claimed as new and is desired to be secured by Letters Patent of the United States is:

1. A method for producing carbon black conducted in an oil furnace comprising:

1) combusting fuel and air or an oxygen containing gas in a first reaction zone where a combusted gas is generated;

2) introducing a feedstock hydrocarbon to said combusted gas in a second reaction zone to produce a carbon black producing reaction; and 3) stopping said carbon black producing reaction with a carbon black producing reaction stopping medium in a third reaction zone, wherein said carbon black producing reaction stopping medium is an inert gas, said second reaction zone is downstream of said first reaction zone, and said third reaction zone is downstream of said second reaction zone.

2. The method of claim 1, wherein said reaction stopping medium comprises ≦20 wt. % water.

3. The method of claim 1, wherein said reaction stopping medium is introduced perpendicular to the axial direction of said oil furnace.

4. The method of claim 1, wherein the flow velocity of said reaction stopping medium is faster than the flow velocity of said combusted gas from said second reaction zone to said third reaction zone.

5. The method of claim 1, wherein the flow velocity of said combusted gas from said second reaction zone to said third reaction zone is 20 m/sec to 30 m/sec, and an introducing velocity of said reaction stopping medium is no less than 40 m/sec.

6. The method of claim 1, wherein said reaction stopping medium is introduced at more than one axial location.

7. The method of claim 1, wherein the residence time from the feedstock introduction point to the stopping of said carbon black producing reaction is 5 to 30 millisecond.

8. The method of claim 1, wherein said fuel is selected from the group consisting of hydrogen, carbon monoxide, methane, natural gas, coal gas, kerosene, gasoline, naphtha, fuel oil, creosote oil, naphthalene oil, carbonic acid oil and a mixture thereof.

9. The method of claim 1, wherein said feedstock hydrocarbon is selected from the group consisting of benzene, toluene, xylene, naphthalene, anthrathene, creosote oil, naphthalene oil, carbonic acid oil, fluid catalytic cracking oil alkyne hydrocarbon, ethylene, propylene, pentane, hexane and a mixture thereof.

10. The method of claim 1, wherein said second reaction zone comprises a choking point, wherein the ratio of the diameter at said choking point to the diameter upstream said choking point is 1/4 to 1/9.

11. The method of claim 1, wherein said second reaction zone comprises a choking point, wherein the ratio of the diameter at said choking point to the diameter upstream said choking point is 1/5 to 1/6.5.

12. The method of claim 1, wherein said second reaction zone comprises a choking point, and a gas flow velocity at said choking point is from 300 to 500 m/sec.

13. The method of claim 1, wherein the ratio of the amount of carbon in the combusted feedstock hydrocarbon to the amount of carbon in the total feedstock hydrocarbon introduced is from 0.05 to 0.3.

14. The method of claim 1, wherein the ratio of the amount of carbon in the combusted feedstock hydrocarbon to the amount of carbon in the total feedstock hydrocarbon introduced is from 0.1 to 0.2.

* * * * *

UNITED STATES PATENT AND TRADEMARK OFFICE
CERTIFICATE OF CORRECTION

PATENT NO.   : 5,891,414
DATED        : April 6, 1999
INVENTOR(S)  : Shinichi KANAMARU, et al.

It is certified that error appears in the above-identified patent and that said Letters Patent is hereby corrected as shown below:

On the title page, item [75], the first inventor's name should be:

--Shinichi Kanamaru--

Signed and Sealed this

First Day of February, 2000

Attest:

Attesting Officer

Q. TODD DICKINSON

Acting Commissioner of Patents and Trademarks